United States Patent [19]

Numazaki

[11] Patent Number: 5,670,851
[45] Date of Patent: Sep. 23, 1997

[54] POWER CONVERSION CONTROL SYSTEM FOR PLURAL ELECTRIC MOTORS AND AUXILIARY CIRCUIT

[75] Inventor: Mitsuhiro Numazaki, Tokyo, Japan

[73] Assignee: Kabushiki Kaisha Toshiba, Kawasaki, Japan

[21] Appl. No.: 552,843

[22] Filed: Nov. 3, 1995

[30] Foreign Application Priority Data

Mar. 29, 1995 [JP] Japan ................................ 7-070280

[51] Int. Cl.⁶ ...................................... H02P 1/54
[52] U.S. Cl. ...................... 318/106; 318/110; 318/112
[58] Field of Search ............................ 318/34–35, 51, 318/53–64, 66–84, 25, 92, 101, 105–110, 112

[56] References Cited

U.S. PATENT DOCUMENTS

| 4,032,824 | 6/1977 | Elger | 318/45 |
| 4,420,713 | 12/1983 | Chandran et al. | 318/71 |
| 4,454,455 | 6/1984 | Matulevich | 318/71 |
| 5,473,225 | 12/1995 | Miyazaki | 318/52 |

FOREIGN PATENT DOCUMENTS

| 3-98401 | 4/1991 | Japan . |
| 3-78401 | 4/1991 | Japan . |
| 6-86401 | 3/1994 | Japan . |

OTHER PUBLICATIONS

Patent Abstracts of Japan, vol. 15, No. 279 (M–1136), Jul. 16, 1991, JP–A–03–098401, Apr. 24, 1991.
Patent Abstracts of Japan, vol. 15, No. 244 (M–1127), Jun. 24, 1991, JP–A–03–078401, Apr. 3, 1991.

*Primary Examiner*—David S. Martin
*Attorney, Agent, or Firm*—Oblon, Spivak, McClelland, Maier & Neustadt, P.C.

[57] ABSTRACT

An electric vehicle control system for controlling a plurality of main motors for driving an electric vehicle and an auxiliary circuit. The control system includes a first circuit breaker, and a first main power converter for receiving a DC power for converting the DC power into a first AC power to supply the first AC power to the first main motor. The control system further includes a second circuit breaker, and an auxiliary power converter for receiving the DC power for converting the DC power into a second AC power to supply the second AC power to the auxiliary circuit. The control system also includes a second main power converter for receiving the DC power for converting the DC power into a third AC power to supply the third AC power to one of the second main motor and the auxiliary circuit, respectively. The control system further includes a switch device for switching the second main power converter such that when the auxiliary power converter is normal the second main converter is connected to the second main motor to supply the third AC power, and when the auxiliary power converter is broken down the input side of the second main power converter is connected to the second circuit breaker and the output side of the second main power converter is connected to the auxiliary circuit to supply the third AC power.

10 Claims, 7 Drawing Sheets

POWER CONVERSION CONTROL SYSTEM FOR PLURAL ELECTRIC MOTORS AND AUXILIARY CIRCUIT

BACKGROUND OF THE INVENTION

1. Field of the Invention

This invention relates to an electric vehicle control system, and more particularly to an electric vehicle control system for controlling a plurality of motors for driving an electric vehicle and an auxiliary circuit of the electric vehicle.

2. Description of the Related Art

As one of such electric vehicle control systems, hereinafter an electric vehicle control system is described, which is composed of multiple variable voltage variable frequency (hereafter, "VVVF") power converters, which respectively convert DC power to VVVF AC powers and supply these AC powers to electric vehicle drive motors, and a constant voltage constant frequency (hereafter, "CVCF") power converter which converts DC power to CVCF AC power and supplies this AC power to an electric vehicle auxiliary circuit.

In an electric vehicle provided with multiple VVVF power converters which respectively supply VVVF AC powers to electric vehicle drive motors, and a CVCF power converter which supplies CVCF AC power to an electric vehicle auxiliary circuit, the design is that, when the CVCF power converter has broken down, one of the VVVF power converters is controlled so that it supplies CVCF AC power to the electric vehicle auxiliary circuit. By this means, driving of the electric vehicle can be continued with normal operation of the electrically-driven air compressors, battery chargers, electrically-driven cooling air blowers, etc., which are the loads of the electric vehicle auxiliary circuit. An example of such a control system is disclosed in Patent Disclosure (Kokai) No. Heisei 3-98401 Gazette.

In the circuit diagram shown in FIG. 1 of the above Patent Disclosure (Kokai) Heisei No. 3-98401 Gazette, circuit breakers 2 are respectively provided at the stage before multiple VVVF power converters 5. However, in most cases nowadays, a common circuit breaker is provided between the multiple VVVF power converters and the power source. The reason for this is that multiple VVVF power converters are required in order to control the electric vehicle drive motors, respectively. However, there is no particular requirement for the provision of respective circuit breakers. Furthermore, since a circuit breaker is an apparatus with contacts, a common circuit breaker is desirable from the viewpoint of maintenance. FIG. 7 is a block diagram of a conventional electric vehicle control system constructed based on this concept. In FIG. 7, positive input terminals of multiple VVVF power converters (hereafter, "VVVF inverters") 5a–5d are connected to a pantograph 1 via a circuit breaker 2a and filter reactors 3a –3d, respectively. Their negative input terminals are earthed through the wheels. Also, filter capacitors 4 are respectively connected between the positive and negative input terminals of VVVF inverters 5a–5d. Furthermore, electric vehicle drive motors (hereafter, "main motors") 6a–6d are respectively connected to their output terminals. A specified VVVF inverter 5d out of these VVVF inverters 5a–5d is controlled by a control unit 7 so that it is also capable of driving as a CVCF power converter. Control unit 7 is composed of an inverter control common unit (hereafter, "common unit") 7a for driving the switching devices for constructing VVVF inverter 5d; a VVVF control unit 7b which generates drive signals for operating the switching devices so that DC power is converted to VVVF AC power; a CVCF control unit 7c which generates drive signals for operating the switching devices so that DC power is converted to CVCF AC power; and a changeover unit 8 which controls changeover switches 81–83.

Also, the positive input terminal of CVCF power converter (hereafter, "CVCF inverter") 9 is connected to pantograph 1 via a circuit breaker 2b and a filter reactor 3e. Its negative input terminal is earthed through the wheels. Also, filter capacitor 4 is connected between the positive and negative input terminals of CVCF inverter 9. Furthermore, the primary side of a transformer 11 is connected to its output terminals via a waveform filter circuit 10. An electric vehicle auxiliary circuit 14 including the control circuits for VVVF inverters 5a–5d and the circuits for driving electric air blowers for cooling resistors (not shown) of electric vehicle etc., is connected to the secondary side of transformer 11.

Furthermore, changeover switch 81 is provided between common unit 7a and VVVF control unit 7b and CVCF control unit 7c, changeover switch 82 is provided between VVVF inverter 5d and main motor 6d and waveform filter circuit 10, and changeover switch 83 is provided between CVCF inverter 9 and waveform filter circuit 10. These changeover switches 81–83 are controlled by changeover unit 8 to operate with interlocking action. Furthermore, circuit breaker 2b is controlled by changeover unit 8.

In the electric vehicle control system composed in this way, when CVCF inverter 9 breaks down, changeover unit 8 detects this breaking down, and changes over respective switches 81–83 so that they make contact with the sides (the y terminal sides) opposite to the sides (the x terminal sides) shown in FIG. 7. Next, changeover unit 8 opens circuit breaker 2b. Then CVCF inverter 9 is disconnected from electric vehicle auxiliary circuit 14. In its place, predetermined specified VVVF inverter 5d is disconnected from main motor 6d and connected to waveform filter circuit 10. At the same time, instead of VVVF control unit 7b, CVCF control unit 7c is changed over and connected to common unit 7a. Consequently, VVVF inverter 5d operates as the CVCF inverter, and its output is supplied to transformer 11 via waveform filter circuit 10.

In this state, if overcurrents flow in VVVF inverters 5a–5c due to pantograph 1 becoming separated from the overhead power line, or the like, circuit breaker 2a will sometimes open due to the operation of protective action. Also, if an instruction, such as a power instruction OFF (not shown), is outputted from the driver's cab, circuit breaker 2a will be opened in the same way. In such cases, the power supply to VVVF inverter 5d, which is operating as the power source for electric vehicle auxiliary circuit 14, will also be disconnected. Therefore, there is the problem of not being able to supply power to electric vehicle auxiliary circuit 14.

SUMMARY OF THE INVENTION

Accordingly, one object of this invention is to provide an electric vehicle control system which can always continue to supply AC power to an electric vehicle auxiliary circuit in case of an auxiliary power converter breakdown, independent of the state of a main power converter for supplying AC power to a main motor.

These and other objects of this invention can be achieved by providing an electric vehicle control system for controlling a plurality of main motors for driving an electric vehicle and an auxiliary circuit of the electric vehicle. The control system includes a first circuit breaker, and a first main power converter with an input side connected to the first circuit breaker and an output side connected to a first main motor out of a plurality of the main motors, for receiving a DC power through the first circuit breaker for converting the DC power into a first AC power to supply the first AC power to the first main motor. The control system further includes a second circuit breaker, and an auxiliary power converter with an input side connected to the second circuit breaker and an output side connected to the auxiliary circuit, for receiving the DC power through the second circuit breaker for converting the DC power into a second AC power to supply the second AC power to the auxiliary circuit. The control system also includes a second main power converter with an input side connected to one of the first circuit breaker and the second circuit breaker and an output side connected to one of a second main motor out of a plurality of the main motors and the auxiliary circuit, for receiving the DC power through one of the first and second circuit breakers for converting the DC power into a third AC power to supply the third AC power to one of the second main motor and the auxiliary circuit, respectively. The control system further includes a switch device for switching the second main power converter such that when the auxiliary power converter is normal the output side of the second main converter is connected to the second main motor to supply the third AC power to the second main motor, and when the auxiliary power converter is broken down the input side of the second main power converter is connected to the second circuit breaker and the output side of the second main power converter is connected to the auxiliary circuit to supply the third AC power to the auxiliary circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
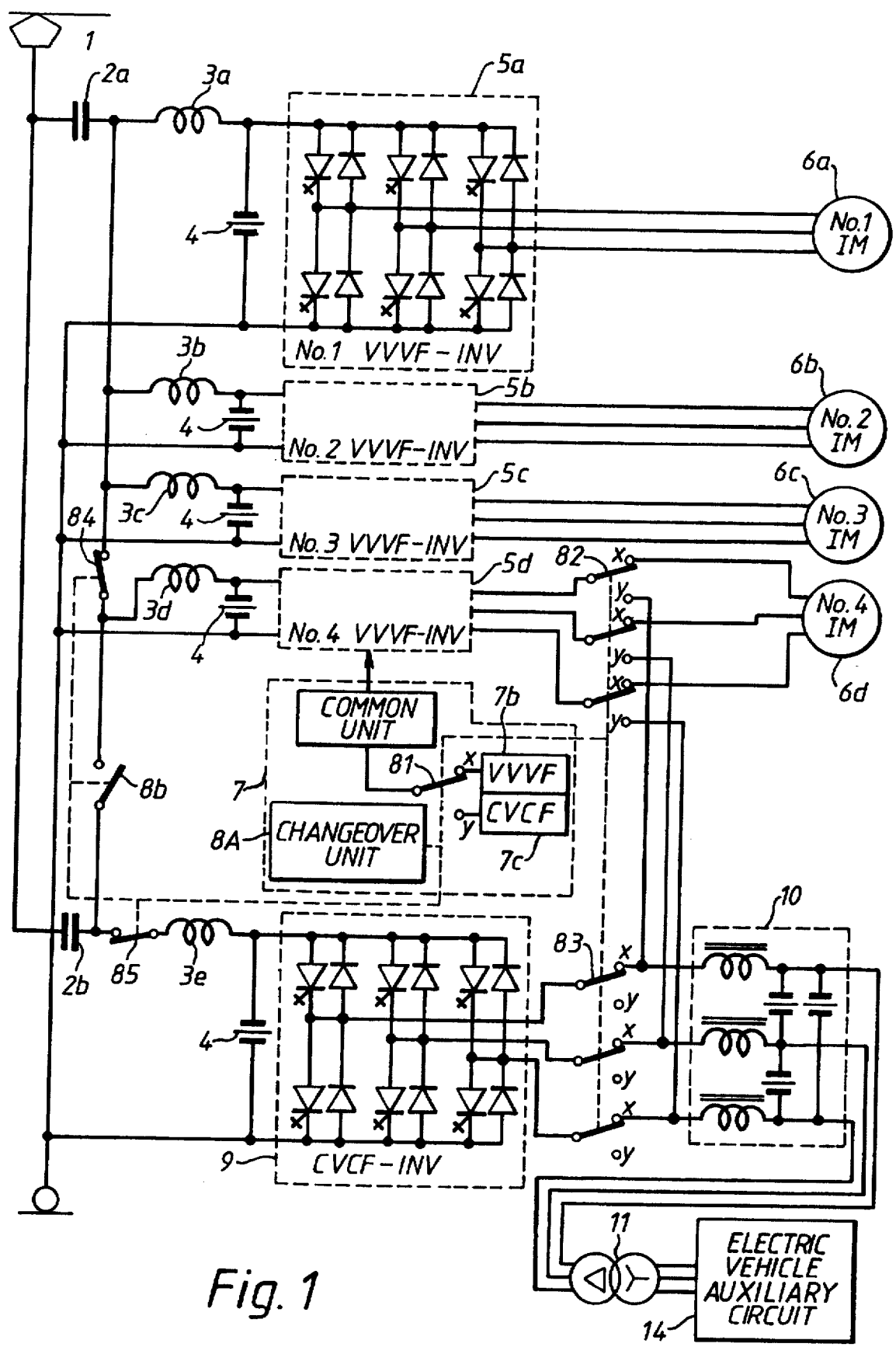
FIG. 1 is a block diagram of an electric vehicle control system showing a first embodiment of this invention.

Referring now to the drawings, wherein like reference numerals designate identical or corresponding parts throughout the several views, the embodiments of this invention will be described below.

FIG. 1 is a block diagram of an electric vehicle control system showing a first embodiment of this invention. Respective filter reactors $3a$–$3d$ and positive input terminals of multiple VVVF inverters $5a$–$5d$ are connected to pantograph 1 via circuit breaker $2a$, while negative input terminals of VVVF inverters $5a$–$5d$ are earthed through the wheels. Also, respective filter capacitors 4 are connected between the positive and negative input terminals of VVVF inverters $5a$–$5d$. Furthermore, multiple main motors $6a$–$6d$ are connected to respective output terminals of VVVF inverters $5a$–$5d$. Specified VVVF inverter $5d$ out of these VVVF inverters $5a$–$5d$ is controlled by control unit 7 so that it is also able to drive as a CVCF inverter. Control unit 7 is composed of common unit $7a$ for driving the switching devices which construct VVVF inverter $5d$; VVVF control unit $7b$ which generates drive signals for operating the switching devices so that DC power is converted to VVVF AC power; CVCF control unit $7c$ which generates drive signals for operating the switching devices so that DC power is converted to CVCF AC power; and a changeover unit 8A which controls changeover switches 81–83, switches 84, 85 and 86.

Also, the positive input terminal of CVCF inverter 9 is connected to pantograph 1 via circuit breaker $2b$ and filter reactor $3e$. Its negative input terminal is earthed through the wheels. Also, filter capacitor 4 is connected between the positive and negative input terminals of CVCF inverter 9. Furthermore, the primary side of transformer 11 is connected to its output terminals via waveform filter circuit 10. Electric vehicle auxiliary circuit 14 including the control circuits for VVVF inverters $5a$–$5d$ and the circuits for driving electric air blowers for cooling resistors etc., is connected to the secondary side of transformer 11.

Furthermore, changeover switch 81 is provided between common unit $7a$ and VVVF control unit $7b$ and CVCF control unit $7c$; changeover switch 82 is provided between VVVF inverter $5d$ and main motor $6d$ and waveform filter circuit 10, and changeover switch 83 is provided between CVCF inverter 9 and waveform filter circuit 10. Also, switch 84 is provided between circuit breaker $2a$ and filter reactor $3d$; switch 85 is provided between circuit breaker $2b$ and filter reactor $3e$; and switch 86 is provided which connects circuit breaker $2b$ and filter reactor $3d$. These changeover switches 81–83, switches 84, 85 and 86 are controlled by changeover unit 8 to operate with interlocking action.

The following is a description of the operation of the first embodiment composed in the above way. Normally, changeover switches 81–83 are held to the x terminal sides, switches 84 and 85 are both closed (hereafter, "ON") and switch 86 is opened (hereafter, "OFF") by changeover unit 8, as shown in FIG. 1. Therefore, VVVF inverters $5a$–$5d$ respectively convert DC power collected by pantograph 1 to VVVF AC powers corresponding to the driving instruction (not shown), and supply these AC powers to main motors $6a$–$6d$. Also, CVCF inverter 9 converts DC power collected by pantograph 1 to CVCF AC power and supplies this AC power to electric vehicle auxiliary circuit 14.

Here, filter reactors $3a$–$3e$ and filter capacitors 4 reduce the ripple component of the overhead power line voltage. In addition, they also reduce the high-frequency currents generated from VVVF inverters $5a$–$5d$ and CVCF inverter 9, respectively. Also, waveform filter circuit 10 shapes the waveform outputted by CVCF inverter 9 to a sine wave, and supplies this shaped power to transformer 11.

Next, the case is described when the output of CVCF inverter 9 is zero due to a breakdown of CVCF inverter 9 itself or of the CVCF control unit (not illustrated) which controls CVCF inverter 9, (hereinafter it may be simply stated as CVCF inverter 9 is broken down). In this time, the secondary side voltage of transformer 11 also becomes zero. When CVCF inverter 9 breaks down, changeover unit 8 detects this breakdown the same way as the conventional and changes over and connects each of changeover switch 81–83 to the side (the y terminal sides) opposite to the state (the x terminal sides) shown in FIG. 1. Also, it switches switches 84 and 85 OFF and then switches switch 86 ON.

When this is done, CVCF inverter 9 is disconnected from electric vehicle auxiliary circuit 14 by changeover switch 83. Also, the output terminals of VVVF inverter 5d are disconnected from main motor 6d, and, instead, the output terminals of VVVF inverter 5d are connected to waveform filter circuit 10 by changeover switch 82. Also, CVCF inverter 9 is disconnected from pantograph 1 by switch 85, and VVVF inverter 5d is disconnected from circuit breaker 2a by switch 84. Then, by switching ON switch 86, DC power is supplied from pantograph 1 to VVVF inverter 5d via circuit breaker 2b. Furthermore, CVCF control unit 7c is changed over and connected to common unit 7a in place of VVVF control unit 7b by changeover switch 81. CVCF control unit 7c generates driving signals and outputs these to common unit 7a to cause the switching devices which compose VVVF inverter 5d to operate so that the DC power is converted to CVCF power. Common unit 7a drives the switching devices based on these driving signals. Therefore, VVVF inverter 5d operates as a CVCF inverter. Thus, CVCF AC power outputted from VVVF inverter 5d is supplied to electric vehicle auxiliary circuit 14 via waveform filter circuit 10 and transformer 11.

Also, VVVF inverter 5d receives a supply of DC power from pantograph 1 via circuit breaker 2b. Therefore, even in a case when circuit breaker 2a is opened due to overcurrents generated in VVVF inverters 5a–5c or for some other cause, VVVF inverter 5d can continue to supply CVCF AC power to electric vehicle auxiliary circuit 14.

When using the first embodiment as described above, even if CVCF inverter 9 breaks down, CVCF power from VVVF inverter 5d can be supplied to electric vehicle auxiliary circuit 14 instead. At the same time, VVVF inverter 5d can supply CVCF power to electric vehicle auxiliary circuit 14 without being affected by the operational states of the other VVVF inverters 5a–5c.

Figure 2:
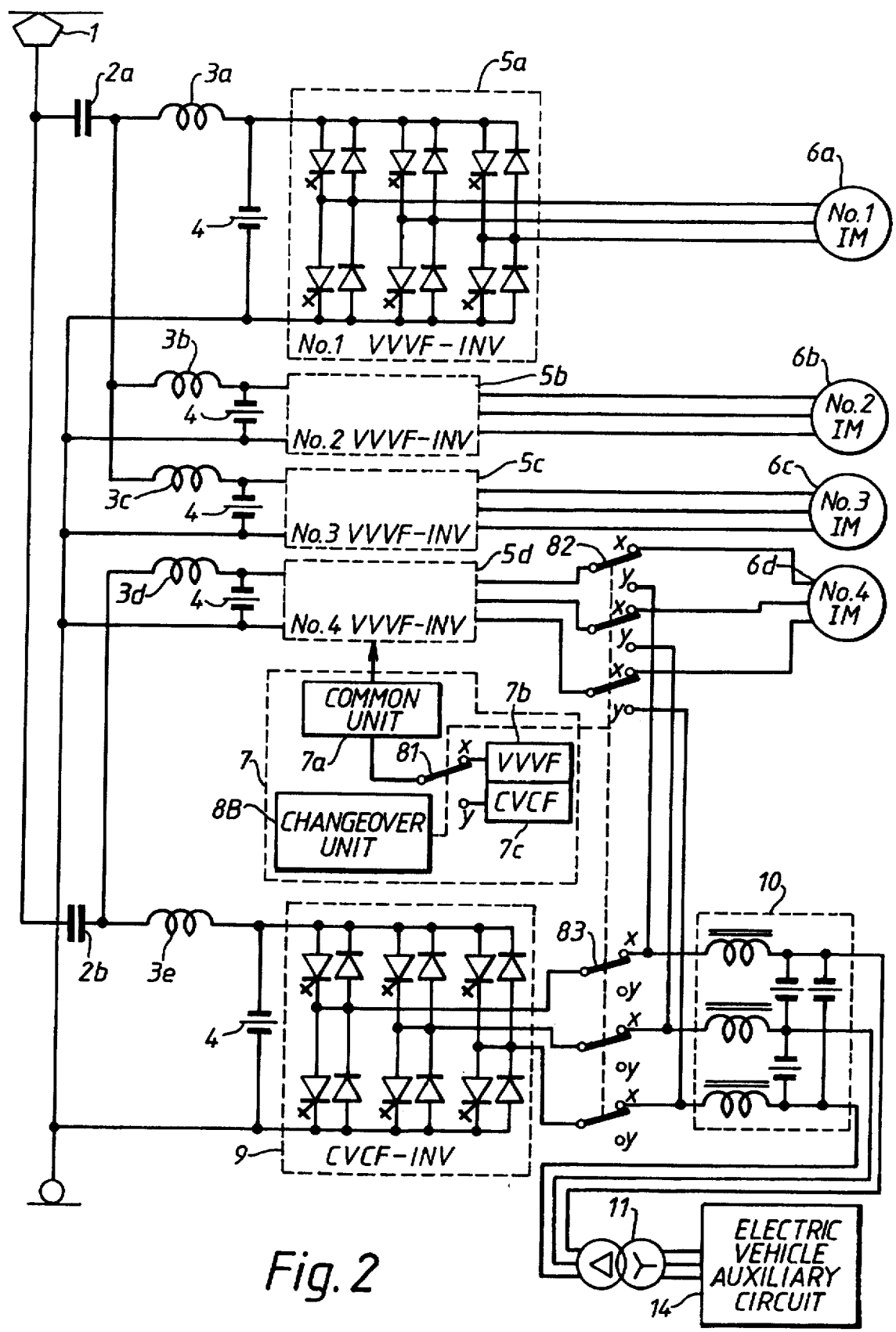
FIG. 2 is a block diagram of an electric vehicle control system showing a second embodiment of this invention.

FIG. 2 is a block diagram of an electric vehicle control system showing a second embodiment of this invention. In this embodiment, VVVF inverters 5a–5c are respectively connected to pantograph 1 via circuit breaker 2a and filter reactors 3a–3c. VVVF inverter 5d and CVCF inverter 9 are respectively connected to pantograph 1 via circuit breaker 2b and filter reactors 3d and 3e.

Therefore, normally, DC power is supplied to VVVF inverters 5a–5c via circuit breaker 2a, while DC power is supplied to VVVF inverter 5d and CVCF inverter 9 via circuit breaker 2b. Then, when CVCF inverter 9 itself or the control unit which controls CVCF inverter 9 breaks down, a changeover unit 8B changes over and connects each of changeover switches 81–83 to the side (the y terminal sides) opposite to the state (the x terminal sides) shown in FIG. 2. Therefore, VVVF inverter 5d operates as a CVCF inverter. Thus, the CVCF AC power outputted from VVVF inverter 5d is supplied to electric vehicle auxiliary circuit 14 via waveform filter circuit 10 and transformer 11. Also, VVVF inverter 5d receives a DC supply from pantograph 1 via circuit breaker 2b. Therefore, even if circuit breaker 2a opens due to the overcurrents generated in the other VVVF inverters 5a–5c or for some other reason, VVVF inverter 5d can continue to supply CVCF AC power to electric vehicle auxiliary circuit 14.

Figure 3:
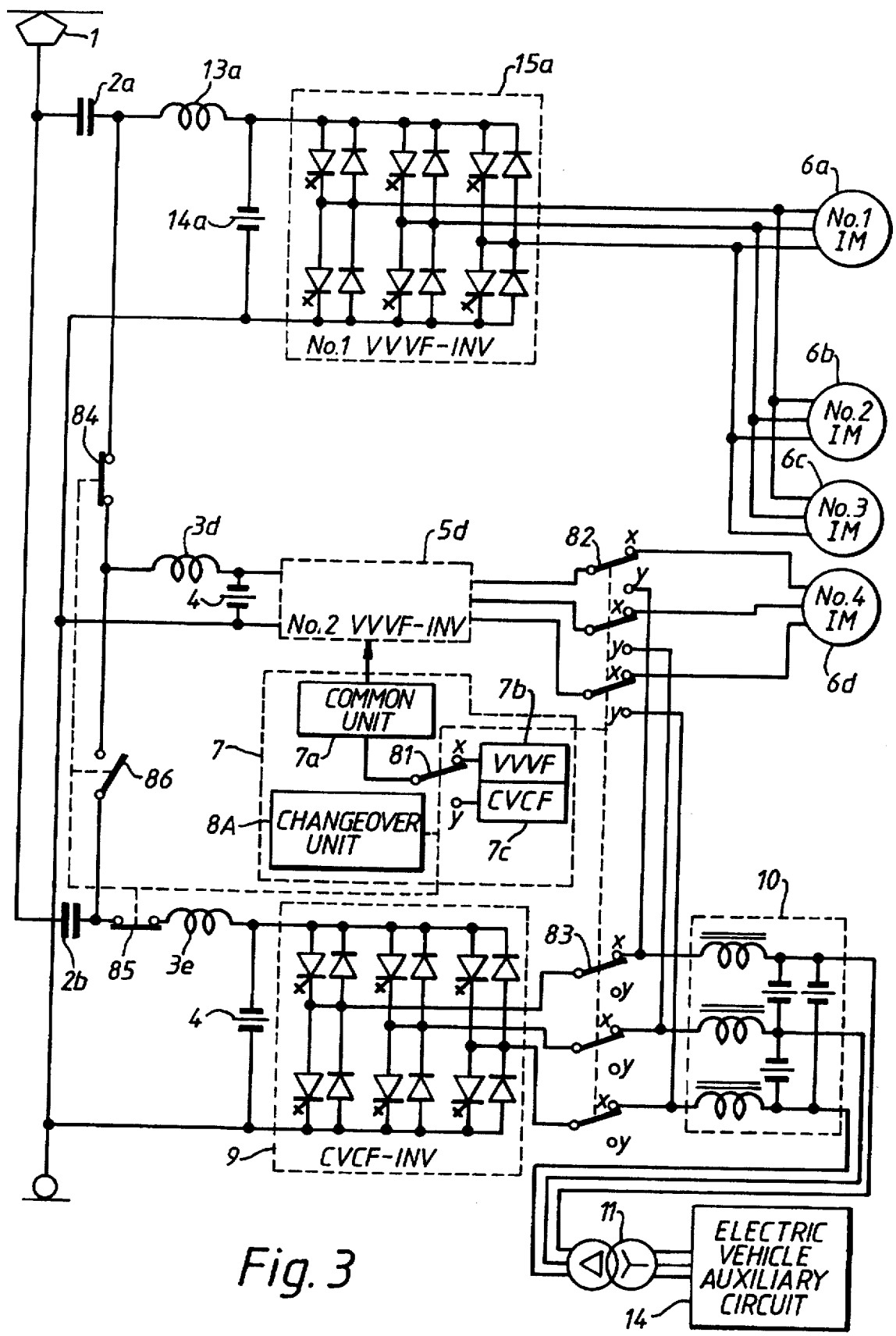
FIG. 3 is a block diagram of an electric vehicle control system showing a third embodiment of this invention.

FIG. 3 is a block diagram of an electric vehicle control system showing a third embodiment of this invention. In this embodiment, a VVVF inverter 15a is connected to pantograph 1 via circuit breaker 2a and s filter reactor 13a, and its output terminals are connected in parallel to multiple main motors 6a–6c. Also a filter capacitor 14a is connected between the positive and negative input terminals of VVVF inverter 15a. Furthermore, VVVF inverter 5d is connected to pantograph 1 via circuit breaker 2a and filter reactor 3d and its output terminals are connected to main motor 6d. The rest of the composition and operation are the same as those of the first embodiment. That is to say, this embodiment is applied to a system provided with VVVF inverter 15a which collectively controls main motors 6a–6c and VVVF inverter 5d which individually controls main motor 6d. Accordingly, the same effect as in the first embodiment can also be obtained with this embodiment.

Figure 4:
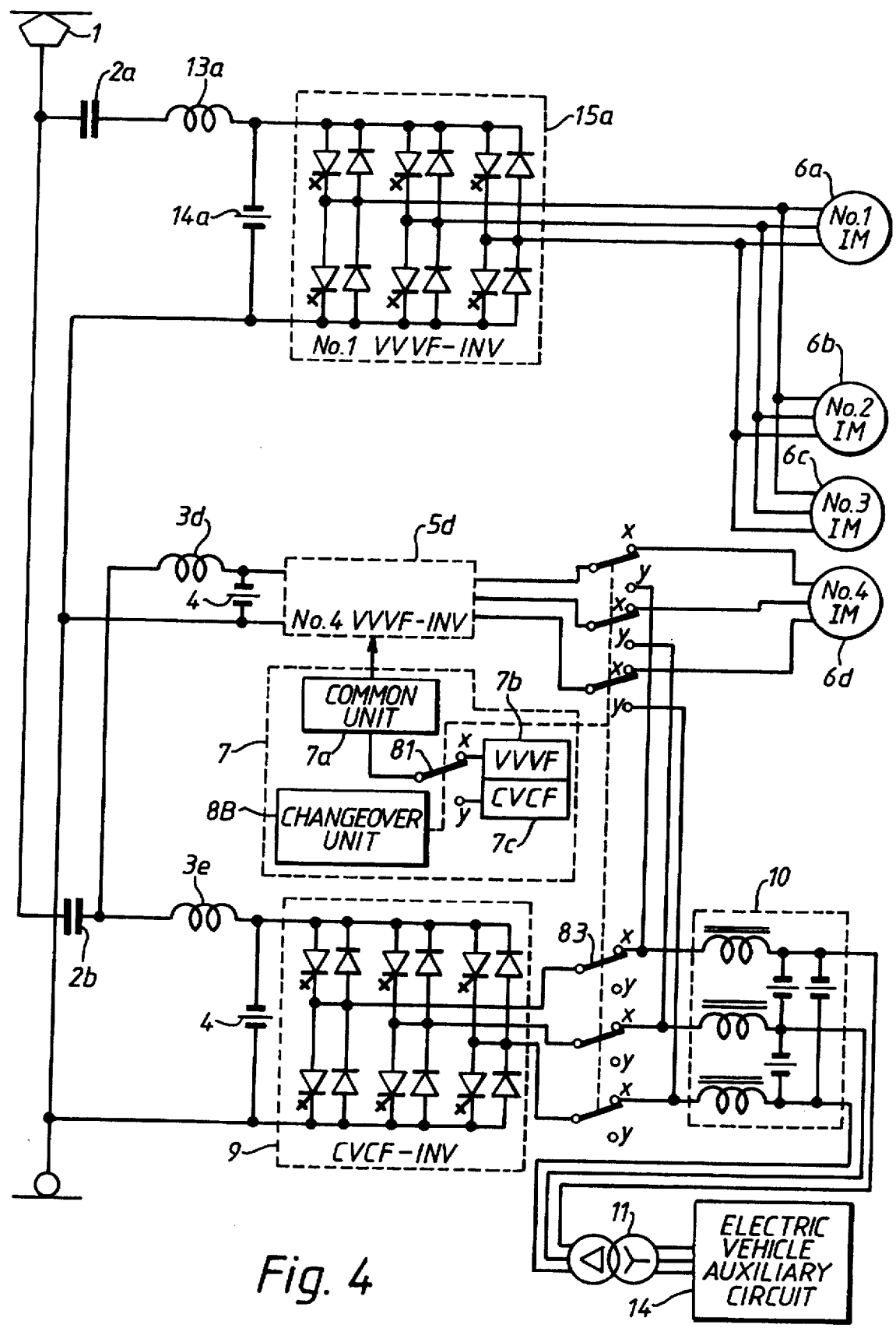
FIG. 4 is a block diagram of an electric vehicle control system showing a fourth embodiment of this invention.

FIG. 4 is a block diagram of an electric vehicle control system showing a fourth embodiment of this invention. In this embodiment, VVVF inverter 15a is connected to pantograph 1 via circuit breaker 2a and filter reactor 13a, and its output terminals are connected in parallel to main motors 6a–6c. Also, filter capacitor 14a is connected between the positive and negative input terminals of VVVF inverter 15a. Furthermore, VVVF inverter 5d and CVCF inverter 9 are connected to pantograph 1 via circuit breaker 2b and filter reactors 3d and 3e respectively. The remainder of the composition and operation are the same as those of the second embodiment. That is to say, this embodiment is applied to a system provided with collective control type VVVF inverter 15a and individual control type VVVF inverter 5d in the same way as in the third embodiment. Accordingly, the same effect as in the second embodiment can also be obtained with this embodiment.

With the above third and fourth embodiments, examples have been given of three main motors 6a–6c connected to the output terminals of VVVF inverter 15a. However, this invention is not limited to these embodiments. Two main motors 6a and 6b may be connected to the output terminals of VVVF inverter 15a, while the remaining two main motors 6c and 6d may be connected to the output terminals of VVVF inverter 5d via changeover switch 82. In these cases, since two main motors 6c and 6d are connected to the output terminals of VVVF inverter 5d, in the event of CVCF inverter 9 breaking down, two main motors 6c and 6d will be disconnected from VVVF inverter 5d by changeover switch 82. Accordingly, except the disconnection of main motor 6c, the same effects as in the third and fourth embodiment can also be obtained with these embodiments, respectively.

Figure 5:
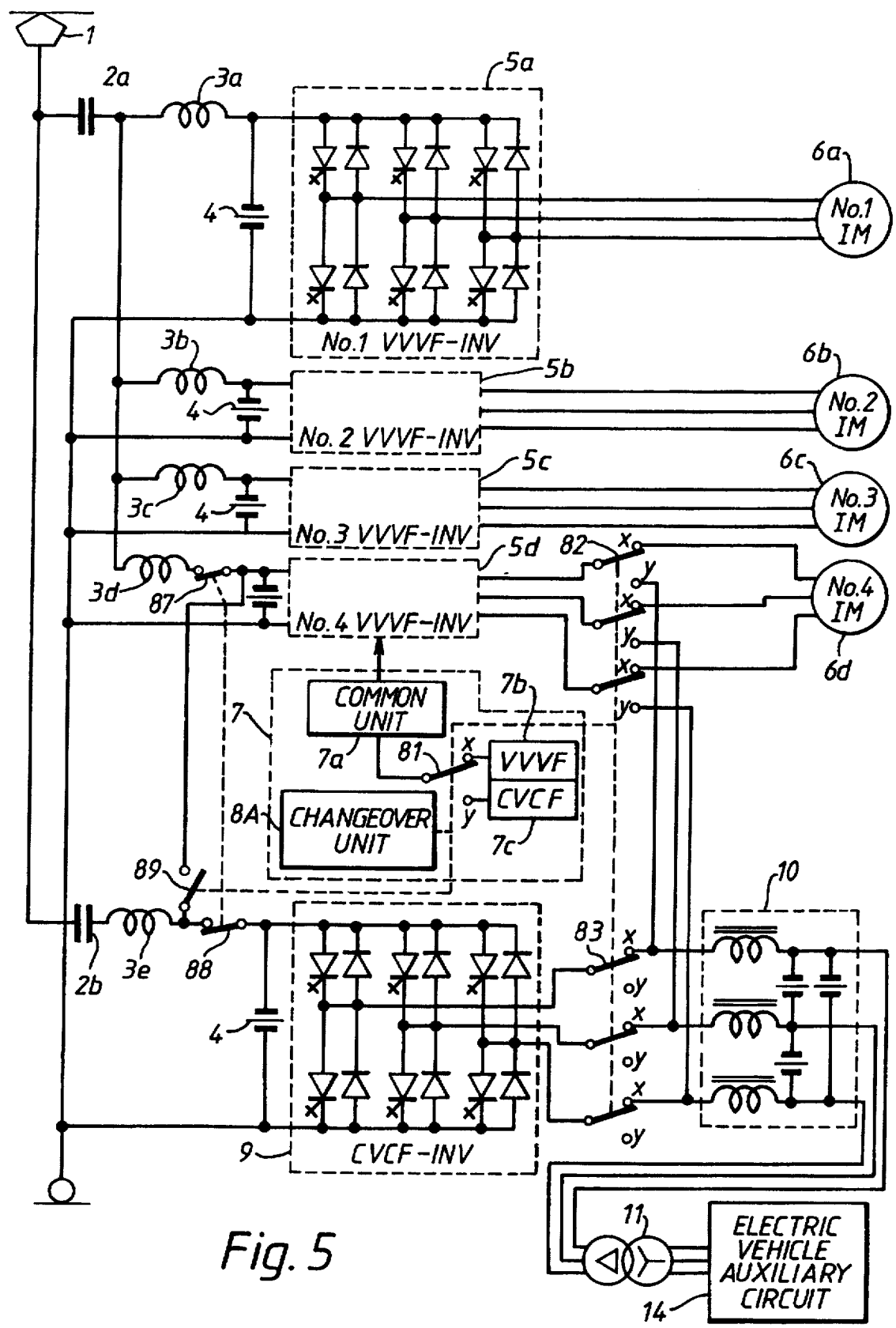
FIG. 5 is a block diagram of an electric vehicle control system showing a fifth embodiment of this invention.

FIG. 5 is a block diagram of an electric vehicle control system showing a fifth embodiment of this invention. In this embodiment, switches 87, 88 and 89 are provided instead of switches 84, 85 and 86 in the first embodiment. The positions of switches 87, 88 and 89 differ from those of switches 84, 85 and 86 in the first embodiment, while the rest is the same. In other words, switch 87 is provided between filter reactor 3d and VVVF inverter 5d; switch 88 is provided between filter reactor 3e and CVCF inverter 9; and switch 89 is provided between filter reactor 3e and VVVF inverter 5d. Normally, switches 87 and 88 are switched ON and switch 89 is switches OFF, as shown in FIG. 5. However, when CVCF inverter 9, or the control unit which controls CVCF inverter 9, breaks down, switches 87 and 88 are switched OFF and switch 89 is switched ON by changeover unit 8A of control unit 7. Therefore, when CVCF inverter 9 has broken down, VVVF inverter 5d receives a supply of DC power from pantograph 1 via circuit breaker 2b and filter reactor 3e. In this embodiment, the constants of filter capacitors 4 of VVVF inverters 5a–5d and CVCF inverter 9 are respectively set to the same value. In this embodiment, the inductance value of filter reactor 3d is, for example, 23 mH, while that of filter reactor 3e is, for example, 23–60 mH which is varied based on the load of electric vehicle auxiliary circuit 14. By this means, when CVCF inverter 9 breaks down, the filter constant of the VVVF inverter 5d side viewed from circuit breaker 2b will be the same as that of the CVCF inverter 9 side was when CVCF inverter 9 was normal and connected. Therefore, the higher harmonic reduction effect for the overhead line when VVVF inverter 5d is supplying CVCF AC power to electric vehicle auxiliary circuit 14 can be made the same as normal.

Figure 6:
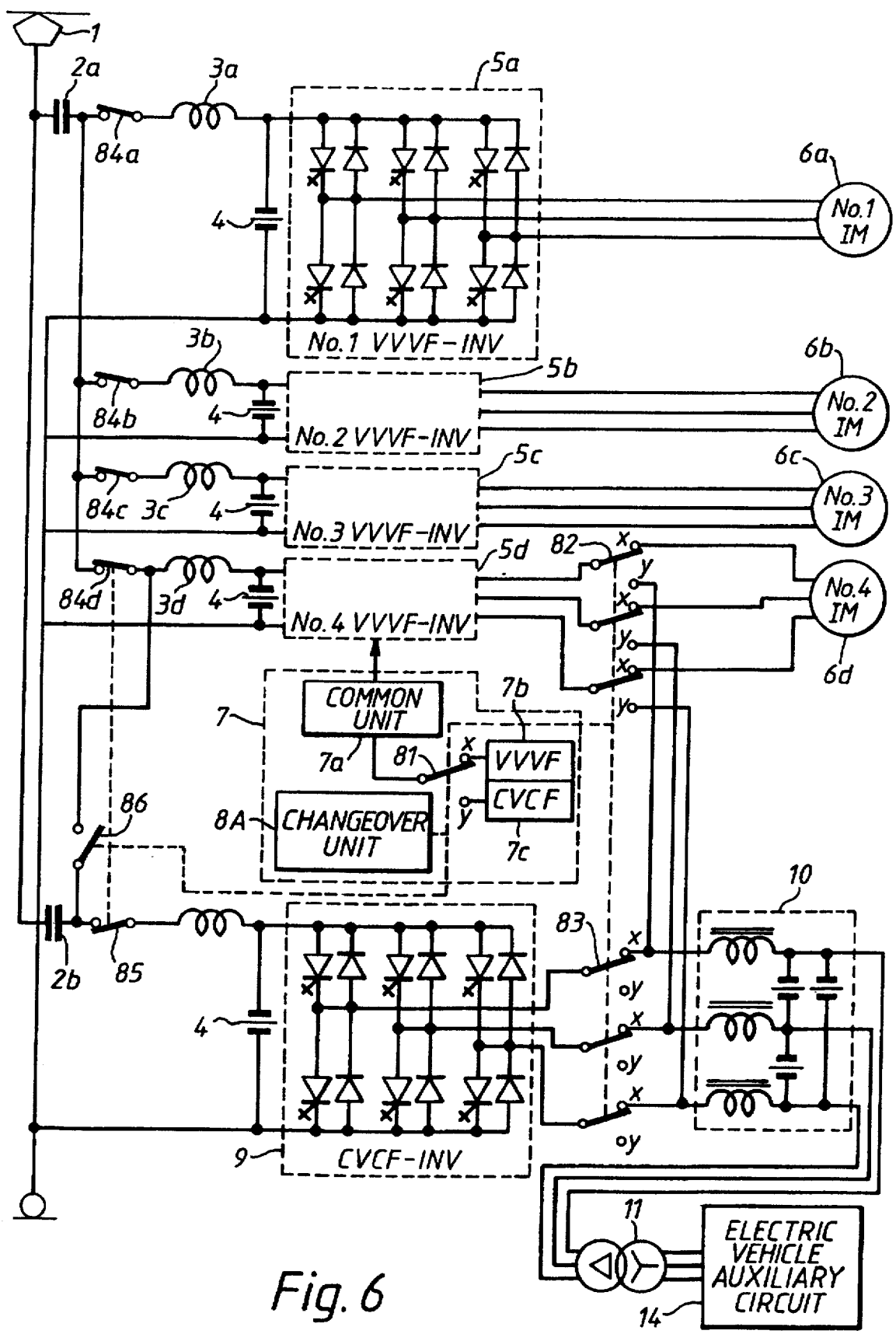
FIG. 6 is a block diagram of an electric vehicle control system showing a sixth embodiment of this invention.
Figure 7:
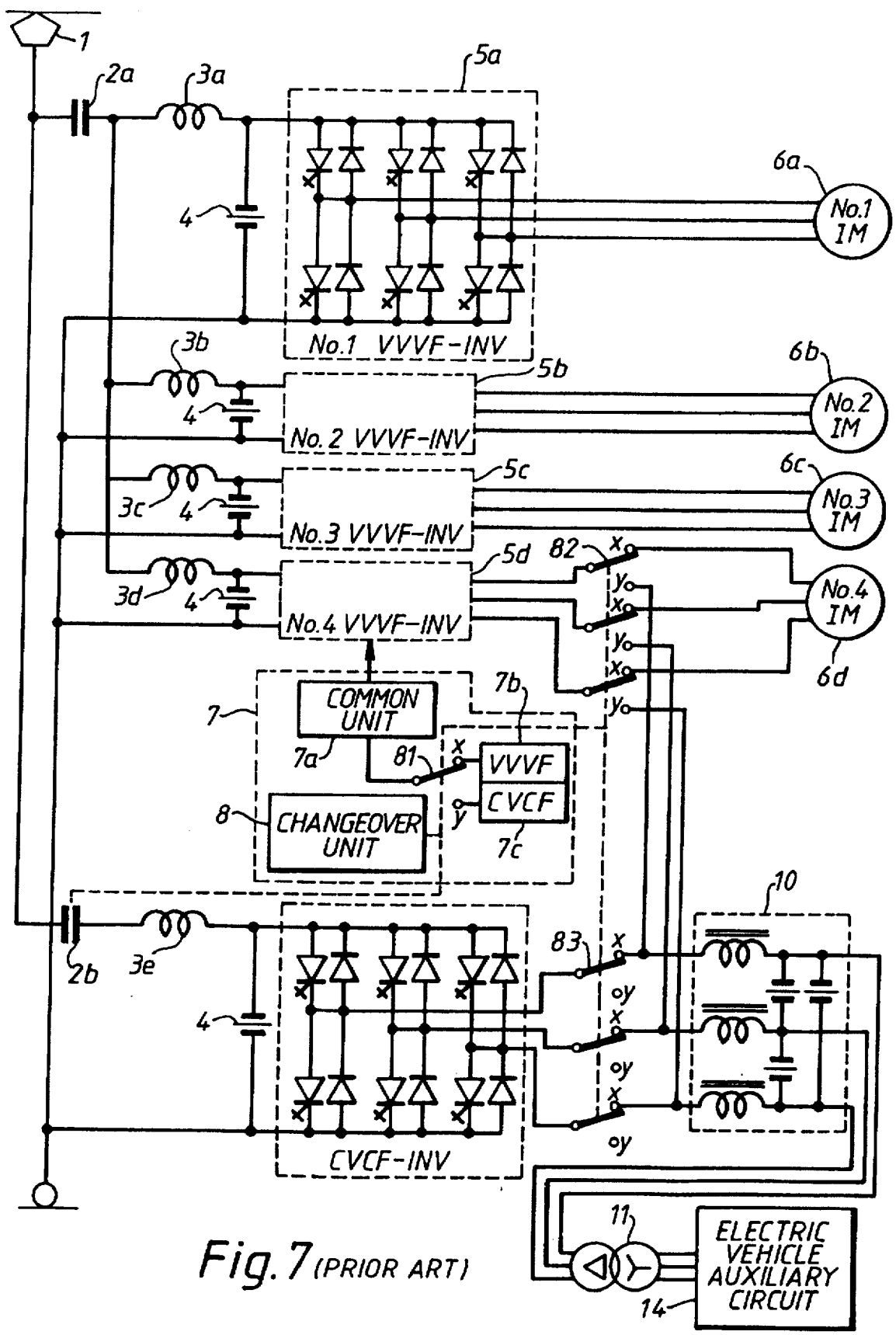
FIG. 7 is a block diagram of a prior art electric vehicle control system.

FIG. 6 is a block diagram of an electric vehicle control system showing a sixth embodiment of this invention. In this embodiment, instead of switch 84 in the first embodiment, switches 84a–84d are provided which open the DC input terminals of respective VVVF inverters 5a–5d, While the rest is the same. These switches 84a–84d are normally switched ON as shown in FIG. 6. When, any of VVVF inverters 5a–5d cannot operate due to a breakdown or for any reason, the broken down VVVF inverter out of VVVF inverters 5a–5d is disconnected by switching OFF the corresponding one of switches 84a–84d, while normal operation is performed by the rest of the VVVF inverters 5a–5d. In this type of system, switch 84d which disconnects VVVF inverter 5d when it breaks down can also be used as the switch which disconnects VVVF inverter 5d from circuit breaker 2a when CVCF inverter 9 breaks down.

In the above-described embodiments, this invention is applied to the electric vehicle control system composed of multiple VVVF inverters for supplying VVVF AC powers to respective main motors and the CVCF inverter for supplying CVCF AC power to the electric vehicle auxiliary circuit.

But this invention is not limited to these embodiments. This invention can also he applied to an electric vehicle control system composed of multiple main power converters for converting DC power to first AC powers and for supplying the first AC powers to respective main motors and an auxiliary power converter for converting the DC power to a second AC power and for supplying the second AC power to the electric vehicle auxiliary circuit.

With this invention as described above, even if the auxiliary power converter becomes unable to supply the second AC power to the electric vehicle auxiliary circuit, stable second AC power can be supplied continuously to the electric vehicle auxiliary circuit from a specified one of the main power converters for supplying first AC powers to respective main motors, independent of the operational state of the other main power converters.

Obviously, numerous modifications and variations of the present invention are possible in light of the above teachings. It is therefore to be understood that within the scope of the appended claims, the invention may be practiced otherwise than as specifically described herein.

What is claimed is:

1. An electric vehicle control system for controlling a plurality of main motors for driving an electric vehicle and an auxiliary circuit of said electric vehicle, said control system comprising:
   a first circuit breaker;
   a first main power converter with an input side connected to said first circuit breaker and an output side connected to a first main motor out of a plurality of said main motors, for receiving a DC power through said first circuit breaker for converting said DC power into a first AC power to supply said first AC power to said first main motor;
   a second circuit breaker;
   an auxiliary power converter with an input side connected to said second circuit breaker and an output side connected to said auxiliary circuit, for receiving said DC power through said second circuit breaker for converting said DC power into a second AC power to supply said second AC power to said auxiliary circuit;
   a second main power converter with an input side connected to one of said first circuit breaker and said second circuit breaker and an output side connected to one of a second main motor out of a plurality of said main motors and said auxiliary circuit, for receiving said DC power through one of said first and second circuit breakers for converting said DC power into a third AC power to supply said third AC power to one of said second main motor and said auxiliary circuit respectively;
   detection means for detecting whether said auxiliary power converter is operating normally or malfunctioning; and
   switch means for controlling connections to said input side and said output side of said second main power converter such that when said auxiliary power converter is detected by said detection means as operating normally, said input side is connected to receive DC power solely via said first circuit breaker and said output side is connected to supply said third AC power solely to said second main motor, and when said auxiliary power converter is detected by said detection means as malfunctioning, said input side is connected to receive DC power solely via said second circuit breaker and said output side is connected to supply said third AC power solely to said auxiliary circuit.

2. The electric vehicle control system according to claim 1:
   wherein said switch means further controls two conversion modes of said second main power converter such that a first conversion mode is invoked when said auxiliary power converter is operating normally, during said first conversion mode said second main power converter provides AC power equivalent to said third AC power to said second main motor, and a second conversion mode is invoked when said auxiliary power converter is malfunctioning, and during said second conversion mode said second main converter provides AC power equivalent to said second AC power to said auxiliary circuit.

3. The electric vehicle control system according to claim 2, wherein:
   said first main power converter is a variable voltage variable frequency power converter for converting said DC power into a variable voltage variable frequency AC power as said first AC power to supply said variable voltage variable frequency AC power to said first main motor as said first AC power;
   said auxiliary power converter is a constant voltage constant frequency power converter for converting said DC power into a constant voltage constant frequency AC power as said second AC power to supply said constant voltage constant frequency AC power to said auxiliary circuit as said second AC power; and
   said second main converter converts said DC power into said variable voltage variable frequency AC power as said third AC power to supply said variable voltage variable frequency AC power as said third AC power to said second main motor when said constant voltage constant frequency power converter is operating normally, and said second main converter converts said DC power into said constant voltage constant frequency AC power as said third AC power to supply said constant voltage constant frequency AC power as said third AC power to said auxiliary circuit when said constant voltage constant frequency power converter is malfunctioning.

4. The electric vehicle control system according to claim 2, wherein said switch means includes:

a first changeover switch for switching said two conversion modes of said second main power converter;

a second changeover switch provided between said output side of said second main power converter and said second main motor;

a third changeover switch provided between said output side of said second main power converter and said auxiliary circuit;

a first switch provided between said first circuit breaker and said second main power converter;

a second switch provided between said second circuit breaker and said auxiliary power converter; and a third switch provided between said second circuit breaker and said second main power converter.

5. The electric vehicle control system according to claim 4, further comprising:

a first filter reactor connected between said first circuit breaker and said first main power converter;

a second filter reactor connected between said second switch and said auxiliary power converter; and a third filter reactor connected between said first switch and said second main power converter;

wherein said third switch is provided between said second circuit breaker and said third filter reactor.

6. The electric vehicle control system according to claim 4, further comprising:

a first filter reactor connected between said first circuit breaker and said first main power converter;

a second filter reactor connected between said second circuit breaker and said second switch; and a third filter reactor connected between said first circuit breaker and said first switch;

wherein said third switch is provided between said second filter reactor and said second power converter.

7. The electric vehicle control system according to claim 2:

wherein said second main power converter is connected to said second circuit breaker at said input side.

8. The electric vehicle control system according to claim 7, wherein said switch means includes:

a first changeover switch for switching said two conversion modes of said second main power converter;

a second changeover switch provided between said output side of said second main power converter and said second main motor; and a third changeover switch provided between said output side of said second main power converter and said auxiliary circuit.

9. The electric vehicle control system according to claim 2 or claim 7, wherein:

said first main power converter is composed of a plurality of main power converters connected in parallel;

said first main motor is composed of a plurality of main motors connected in parallel; and each of said main power converters has an input side connected to said first circuit breaker and an output side connected to one of said plurality of main motors, receives said DC power through said first circuit breaker, and converts said DC power into said first AC power to supply said first AC power to one of said plurality of main motors, respectively.

10. The electric vehicle control system according to claim 2 or claim 7, wherein:

said first main motor is composed of a plurality of main motors connected in parallel; and said first main converter has said input side connected to said first circuit breaker and said output side connected to said plurality of main motors, receives said DC power through said first circuit breaker, and converts said DC power into said first AC power to supply said first AC power to a plurality of said main motors.

* * * * *